(12) United States Patent
Boren

(10) Patent No.: US 8,025,131 B1
(45) Date of Patent: Sep. 27, 2011

(54) EDDY CURRENT BRAKING SYSTEM FOR TROLLEY ZIP LINE CABLE WITH A STATIONARY CONDUCTOR

(76) Inventor: Daniel Boren, Kula, HI (US)

(*) Notice: Subject to any disclaimer, the term of this patent is extended or adjusted under 35 U.S.C. 154(b) by 1138 days.

(21) Appl. No.: 11/744,669

(22) Filed: May 4, 2007

(51) Int. Cl.
*B60L 7/00* (2006.01)

(52) U.S. Cl. ........................................... 188/165

(58) Field of Classification Search .................. 188/165, 188/164, 158, 159, 161
See application file for complete search history.

(56) References Cited

U.S. PATENT DOCUMENTS

| | | | |
|---|---|---|---|
| 1,898,555 A | 2/1933 | McCune | |
| 3,070,035 A * | 12/1962 | Russo et al. | 104/113 |
| 3,506,862 A | 4/1970 | Nomura et al. | |
| 3,723,795 A | 3/1973 | Baermann | |
| 4,122,922 A | 10/1978 | Baermann | |
| 5,862,891 A | 1/1999 | Kroger et al. | |
| 6,041,897 A | 3/2000 | Saumweber et al. | |
| 6,062,350 A * | 5/2000 | Spieldiener et al. | 188/161 |
| 6,227,334 B1 * | 5/2001 | Yumura et al. | 187/359 |
| 6,293,376 B1 | 9/2001 | Pribonic | |
| 6,360,669 B1 * | 3/2002 | Albrich | 104/93 |
| 6,412,611 B1 | 7/2002 | Pribonic | |
| 6,533,083 B1 | 3/2003 | Pribonic et al. | |
| 6,550,392 B2 * | 4/2003 | Albrich | 104/89 |
| 2004/0262103 A1 * | 12/2004 | Rosner | 188/164 |
| 2005/0191788 A1 | 9/2005 | Aisenbrey | |
| 2006/0027134 A1 * | 2/2006 | Steele et al. | 104/113 |
| 2006/0278478 A1 * | 12/2006 | Pribonic et al. | 188/159 |
| 2007/0039788 A1 * | 2/2007 | Fulton | 188/164 |
| 2010/0043667 A1 | 2/2010 | Loser et al. | |
| 2010/0107919 A1 | 5/2010 | Perakis | |

FOREIGN PATENT DOCUMENTS

| | | |
|---|---|---|
| FR | 2.832.114 | 5/2003 |
| JP | 2005271704 | 10/2005 |
| WO | WO2005090113 | 9/2005 |

OTHER PUBLICATIONS

Boren, Daniel; Specification from U.S. Appl. No. 11/685,701, filed Mar. 13, 2007; 30 pages.
Boren, Daniel; Drawings from U.S. Appl. No. 11/685,701, filed Mar. 13, 2007; 10 Pages.
Boren, Daniel; Claims from U.S. Appl. No. 11/685,701, filed Mar. 13, 2007; 5 pages.

* cited by examiner

*Primary Examiner* — Xuan Lan Nguyen
(74) *Attorney, Agent, or Firm* — Michael I. Kroll

(57) ABSTRACT

A trolley magnetic braking system having a brake block assembly engagable by a trolley, a substantially stationary conductor that is pitch adjustable and a carrier having magnetic members that are driven along the conductive member for braking a trolley. Providing a pitch adjustable conductor allows for modification of how much of the conductor interfaces with the magnets and therein varying the amount of eddy current applied in the braking apparatus.

14 Claims, 14 Drawing Sheets

EDDY CURRENT BRAKING SYSTEM FOR TROLLEY ZIP LINE CABLE WITH A STATIONARY CONDUCTOR

BACKGROUND OF THE INVENTION

1. Field of the Invention

The present invention relates generally to brake systems and, more specifically, to a trolley magnetic braking system comprising a brake block engagable by a trolley, a substantially stationary conductor that is pitch adjustable and a carrier having magnetic members that are driven along the conductive member providing means for braking a trolley. Providing a pitch adjustable conductor allows for modification of how much of the conductor interfaces with the magnets and therein varying the amount of eddy current applied in the braking apparatus.

The present invention provides for an additional element comprising one or more pulleys that may be used to vary the orientation of the braking system relative to the brake block, e.g. whether the apparatus is in a somewhat horizontal or vertical orientation or somewhere in between.

2. Description of the Prior Art

There are other breaking systems designed for the same purpose. Typical of these is U.S. Pat. No. 1,898,555 issued to McCune on Feb. 21, 1933.

Another patent was issued to Yoshio Nomura et al. on Apr. 14, 1970 as U.S. Pat. No. 3,506,862. Yet another U.S. Pat. No. 3,723,795 was issued to Baermann on Mar. 27, 1973 and still yet another was issued on Oct. 31, 1978 to Baermann as U.S. Pat. No. 4,122,922.

Another patent was issued to Kroger et al. on Jan. 26, 1999 as U.S. Pat. No. 5,862,891. Yet another U.S. Pat. No. 6,041,897 was issued to Saumweber et al. on Mar. 28, 2000. Another was issued to Pribonic on 25, Sep. 2001 as U.S. Pat. No. 6,293,376 and still yet another was issued on Jul. 2, 2002 to Pribonic as U.S. Pat. No. 6,412,611.

Another patent was issued to Pribonic et al. on Mar. 18, 2003 as U.S. Pat. No. 6,533,083. Yet another France Patent No. FR2832114 was issued to Kroger Uwe on May 16, 2003. Another was issued to Yasuaki on Oct. 6, 2005 as Japan Patent No. JP2005271704.

U.S. Pat. No. 1,898,555

Inventor: Joseph McCune

Issued: Feb. 21, 1933

A traction increasing apparatus for rail vehicles, the combination with an electromagnet of a member carried by the vehicle, rods secured to said magnet, brackets secured to said member in which said rods are slidably mounted, springs for yielding maintaining said magnet supported above the rail, and means for maintaining said springs under initial compression.

U.S. Pat. No. 3,506,862

Inventor: Yoshio Nomura et al.

Issued: Apr. 14, 1970

A brake system is claimed in which the eddy current braking devices are mounted to confront another rail laid parallel to a main rail for supporting a vehicle.

U.S. Pat. No. 3,723,395

Inventor: Max Baermann

Issued: Mar. 27, 1973

A novel eddy-current and hysteretic brake for track-bound vehicles is provided which incorporates resisting skids or rollers to eliminate wear problems associated with prior art brakes of this type. The particular magnetic construction of the pole surface is critical to obtain maximum hysteretic and eddy-current forces with a uniform air gap and the minimum energization. The pole surface is also formed to prevent undesirable air currents or the accumulation of dirt or other disturbing external build-up, while providing maximum pole surface and winding relationships. An alternating pole configuration is provided along the direction of movement of the vehicle.

U.S. Pat. No. 4,122,922

Inventor: Max Baermann

Issued: Oct. 31, 1978

An eddy current or hysteresis brake, preferably for track bound vehicles which is infinitely variable and wear-free. A cylindrical rotatable permanent magnet magnetized on its diameter is arranged between a pair of pole pieces in combination with the plurality of stationary magnets, each arranged to magnetize the pole pieces with opposite magnetic polarity. By rotating the cylindrical magnet, the magnetic field at the ends of the pole pieces can be varied from a maximum to zero. The generated flux is projected into the track. Braking occurs by induced eddy currents.

U.S. Pat. No. 5,862,891

Inventor: Uwe Kroger et al.

Issued: Jan. 26, 1999

A magnetic rail brake, particularly an eddy current brake for rail vehicles, has at least one exciter coil which comprises a coil around a pole core as well as a device for holding the coil and/or for the protection against outside environmental influences. The pole core and/or protection device are composed of individual components which are at least largely electrically insulated with respect to one another.

U.S. Pat. No. 6,041,897

Inventor: Eckart Saumweber et al.

Issued: Mar. 28, 2000

A magnetic brake, particularly a linear eddy-current brake for rail vehicles, having a magnet yoke which extends substantially along the whole eddy-current brake, has a concave shape with respect to a plane rail in its installed position.

U.S. Pat. No. 6,293,376

Inventor: Edward Pribonic

Issued: Sep. 25, 2001

Eddy current braking apparatus includes a linear array of spaced apart permanent magnets arranged for defining a slot therebetween. A diamagnetic or non-magnetic fin is disposed and sized for movement through the slot. A pivotal linkage enables the magnets to move with respect to the fin from a spaced apart first position to a second position in which the fin passes through the slot. A control mechanism selectively moves the magnets between the first and second positions.

U.S. Pat. No. 6,412,611

Inventor: Edward Pribonic

Issued: Jul. 2, 2002

An eddy current brake system with dual use conductive fin includes a linear array of spaced apart permanent magnets and a non-magnetic electrically conductive fin. The magnets are mounted with respect to the fin for enabling passage past one another at a distance sufficient to cause eddy currents to be induced resulting in a braking force between the magnets and the fin. A mechanical brake is provided for frictionally engaging the fin and a surface treatment of the fin and enables the fin to sustain mechanical abuse of friction without effecting a change in the eddy current braking.

U.S. Pat. No. 6,533,083

Inventor: Edward Pribonic et al.

Issued: Mar. 18, 2003

Eddy current braking Apparatus is provided which includes a single array of permanent magnet for providing a magnet flux. An electrically conducted member for exclusively engaging the magnetic flux provided by the single array of permanent magnet. The magnets and conductive member are mounted for enabling relative motion between the magnet array and the conductive member to produce any currents in the conductive member resulting in the braking force between magnets and the conductive member. The configuration of the magnets and the conductive member enable the braking system to be installed over curvilinear paths.

France Patent Number FR2832114

Inventor: Uwe Kroger

Issued: May 16, 2003

The brake is held clear of the rail in normal running of the train, but may fall onto the track if its support is damaged or breaks. The system includes a detector and monitoring program that monitors the distance (h) between the brake (2-7) and the track (1'). One or more distance detectors (11,12) measure the air gaps between the magnetic brake and the track.

Japan Patent Number JP2005271704

Inventor: Sakamoto Yasuaki

Issued: Oct. 6, 2005

PROBLEM TO BE SOLVED: To reduce heat generation and temperature rise of a rail in an eddy current brake device using the rail as a secondary conductor.
SOLUTION: The eddy current brake device is disposed at the position opposing to the rails 21, 22 in a rolling stock, and is equipped with an electromagnetic converters 11, 12 and a power converter 15. The electromagnetic converters 11, 12 generate the eddy current in the rail by the magnetic field generated according to the supplied current, and generate an electromotive force in connection with the change of relative position to the rail. The power converter 15 supplies current into the overhead wire or the device consuming or storing power based on the electromotive force impressed from the electromagnetic converters by supplying alternating exciting current into the electromagnetic converters based on the voltage impressed on the rolling stock from the overhead wire and generates the braking force.

While these brake systems may be suitable for the purposes for which they were designed, they would not be as suitable for the purposes of the present invention, as hereinafter described.

SUMMARY OF THE PRESENT INVENTION

A primary object of the present invention is to provide a magnetic braking system that is based on drag created by relative movement between a conductor and a magnet.

Another object of the present invention is to provide a magnetic braking system comprising a brake block in communication with substantially stationary conductor and a carrier having a plurality of magnets thereon.

Yet another object of the present invention is to provide a magnetic braking system where the conductive member is pitch adjustable to varying the generated eddy currents and thereby drag.

Additional objects of the present invention will appear as the description proceeds.

The present invention overcomes the shortcomings of the prior art by providing a trolley magnetic braking system comprising a brake block engagable by a trolley, a substantially stationary conductor that is pitch adjustable and a carrier having magnetic members that are driven along the conductive member providing means for braking a trolley. Providing a pitch adjustable conductor allows for modification of how much of the conductor interfaces with the magnets and therein varying the amount of eddy current applied in the braking apparatus.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
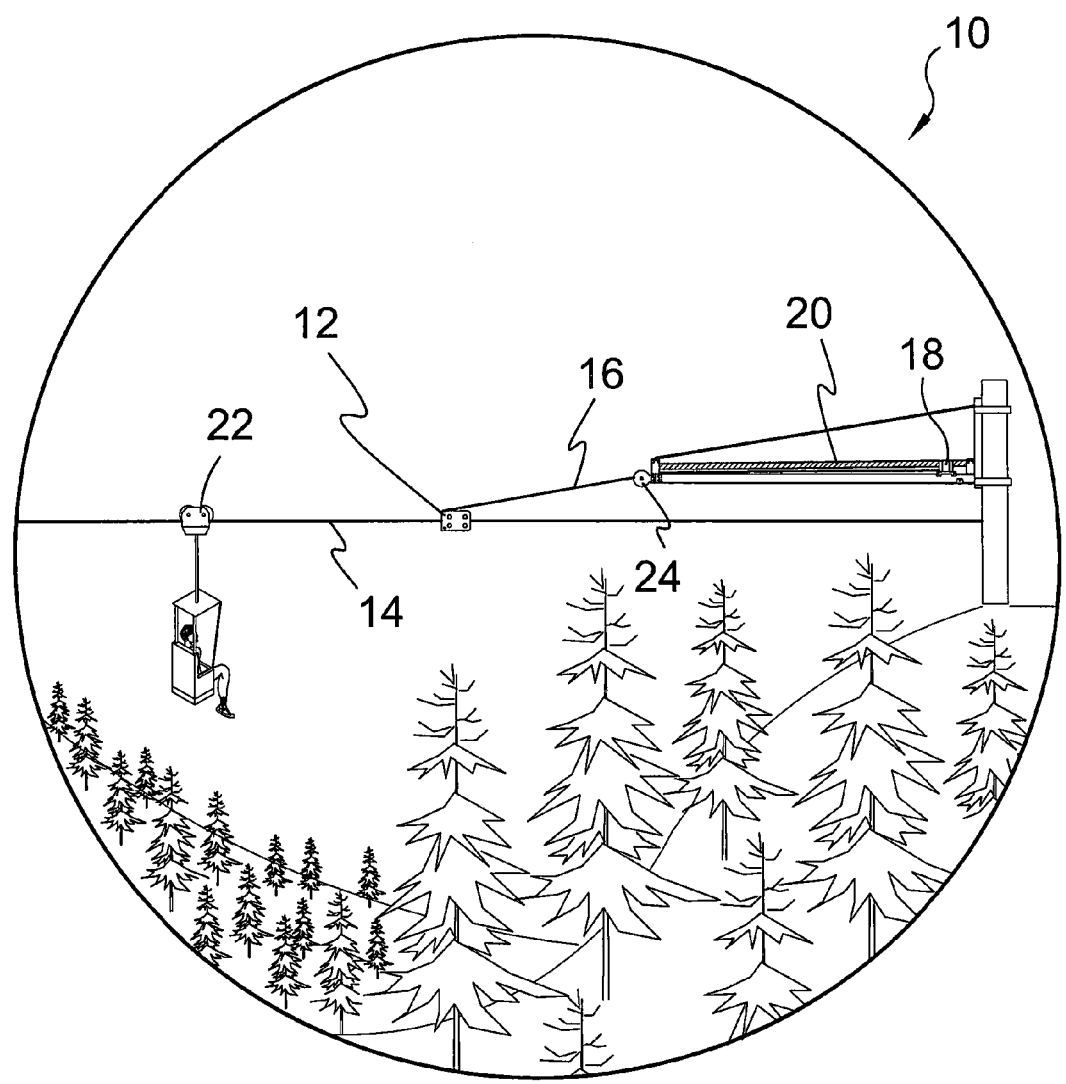
FIG. 1 is an illustrative view of the present invention in use.

Turning now descriptively to the drawings, in which similar reference characters denote similar elements throughout the several views, the figures illustrate the Eddy Current Braking System for Trolley Zip Line Cable with a Stationary Conductor of the present invention. With regard to the reference numerals used, the following numbering is used throughout the various drawing figures.

- 10 Eddy Current Braking System for Trolley Zip Line Cable with a Stationary Conductor
- 12 brake block assembly
- 14 zip line
- 16 brake cable
- 18 magnetic carrier assembly
- 20 copper sheet conductor
- 22 trolley
- 24 pulley
- 26 support post for 20
- 28 slot of 26
- 30 adjustment bolt
- 32 magnet carrier support track
- 34 brake cable connection point
- 36 magnet
- 38 steel back plate for 36
- 40 wheels/covered cam follower
- 42 base of 18
- 44 brake block housing plate
- 46 contact flange of 44
- 48 pulley wheel of 18
- 50 spacer
- 52 washer
- 54 bolt
- 56 connection rod

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention 10 is based on drag created when magnets on a magnetic carrier assembly 18 pass along a copper sheet conductor 20. Angled copper is provided so as the magnets moves it picks up more and more conductor 20. The design allows for easy changes in angle, thus easy adjustment of braking forces. A trolley 22 moves along a zip line 14 and encounters a brake block assembly 12 that is provided to remotely engage the brake system via a brake cable 16 or rope that is redirected to a remote location by a pulley 24 and connected at the other end to the magnet carrier 18. The invention 10 provides a magnetic braking system for use on zipline/cable rides and trolley 22. Keep in mind that any rigging set-up may be employed and oriented to suit the application and that the ones illustrated in the drawing figures are used to demonstrate the relationship of the primary components and their interaction therewith.

Figure 2:
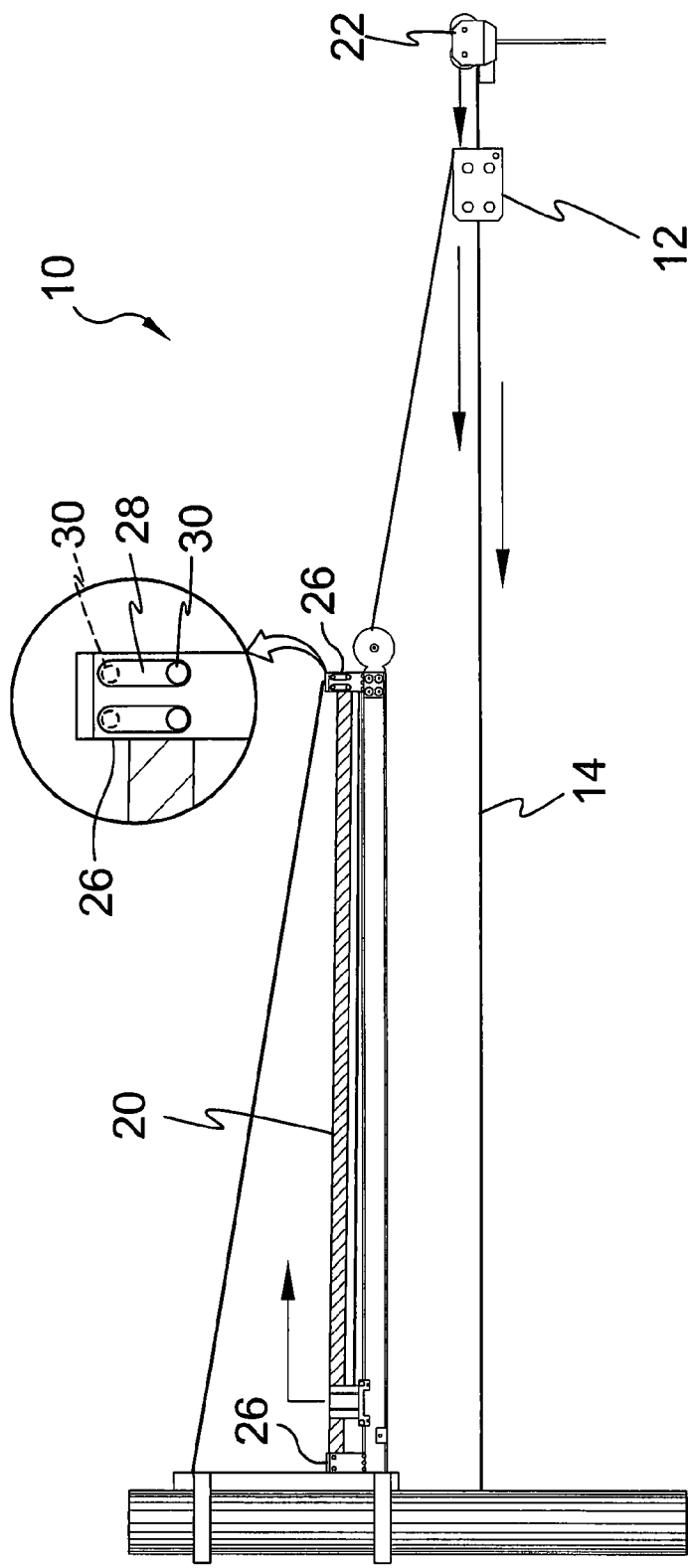
FIG. 2 is a side view of the present invention in use.

FIG. 2 is a side view of the present invention 10 in use. Shown is the position of the present invention 10 prior to the trolley 22 making contact with the brake block 12 on the zip line 14. The conductor 20 is retained in place by support posts 26 and adjustment bolts 30 with at least one having a pair of bolt slots 28 for adjusting the position of the conductor 20 accordingly.

Figure 3:
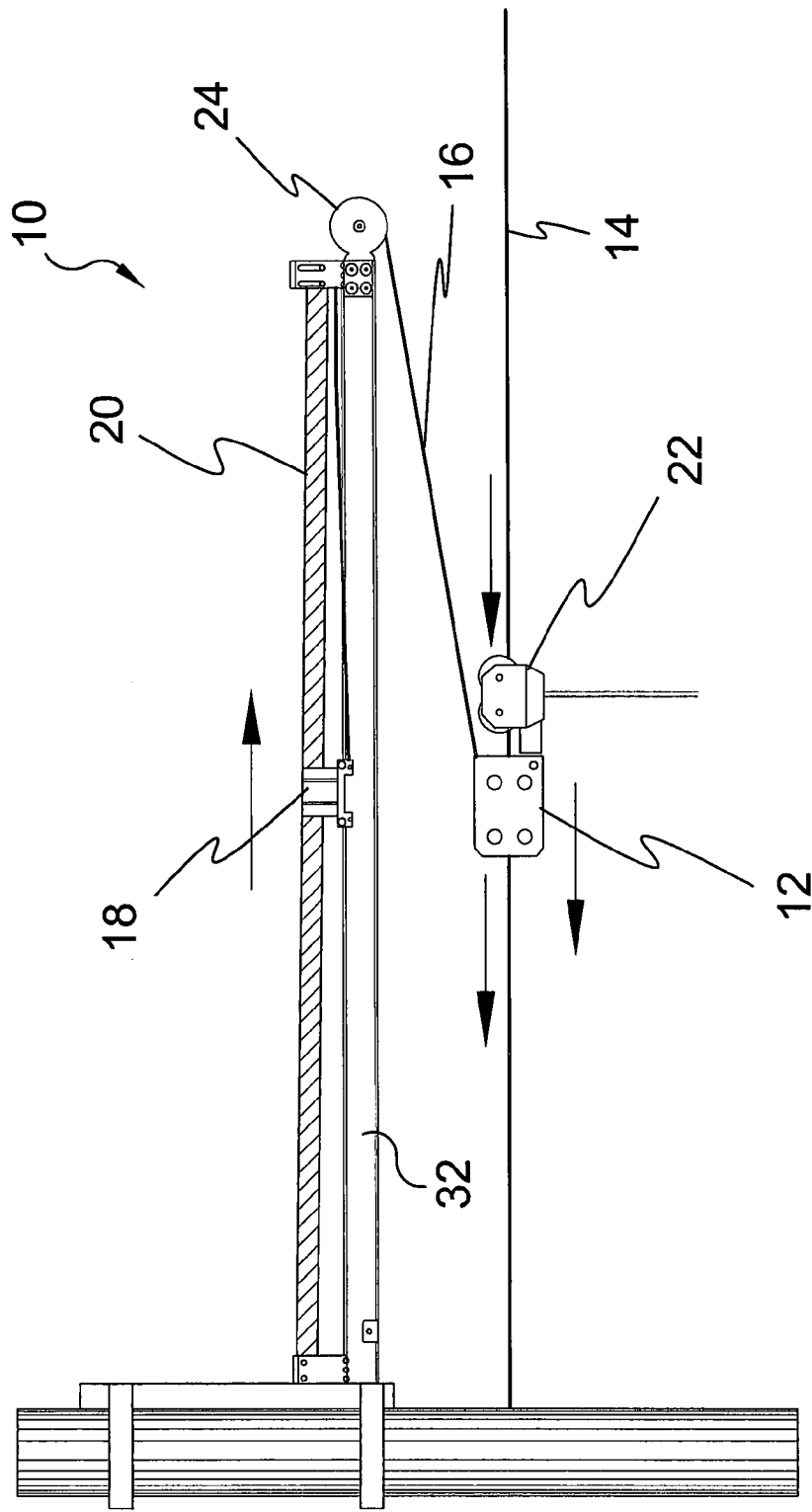
FIG. 3 is a side view of the present invention in use.

FIG. 3 is a side view of the present invention 10 in use. Shown is the half way position of the present invention 10 when the trolley 22 makes contact with the brake block 12 and remotely engages the brake system via a brake cable 16 redirected by a pulley 24 to draw the magnet carrier 18 along a magnet carrier support track 32. The magnets of the magnet carrier 18 are disposed on opposing sides of the conductor 20 wherein the resulting eddy currents serve to create drag to slow down and stop travel of the magnet carrier 18 and the associated brake block 12 and trolley 22. Angled copper is provided so as the magnet moves it picks up more and more conductor 20 and consequently increases the drag through greater exposure to the eddy currents.

Figure 4:
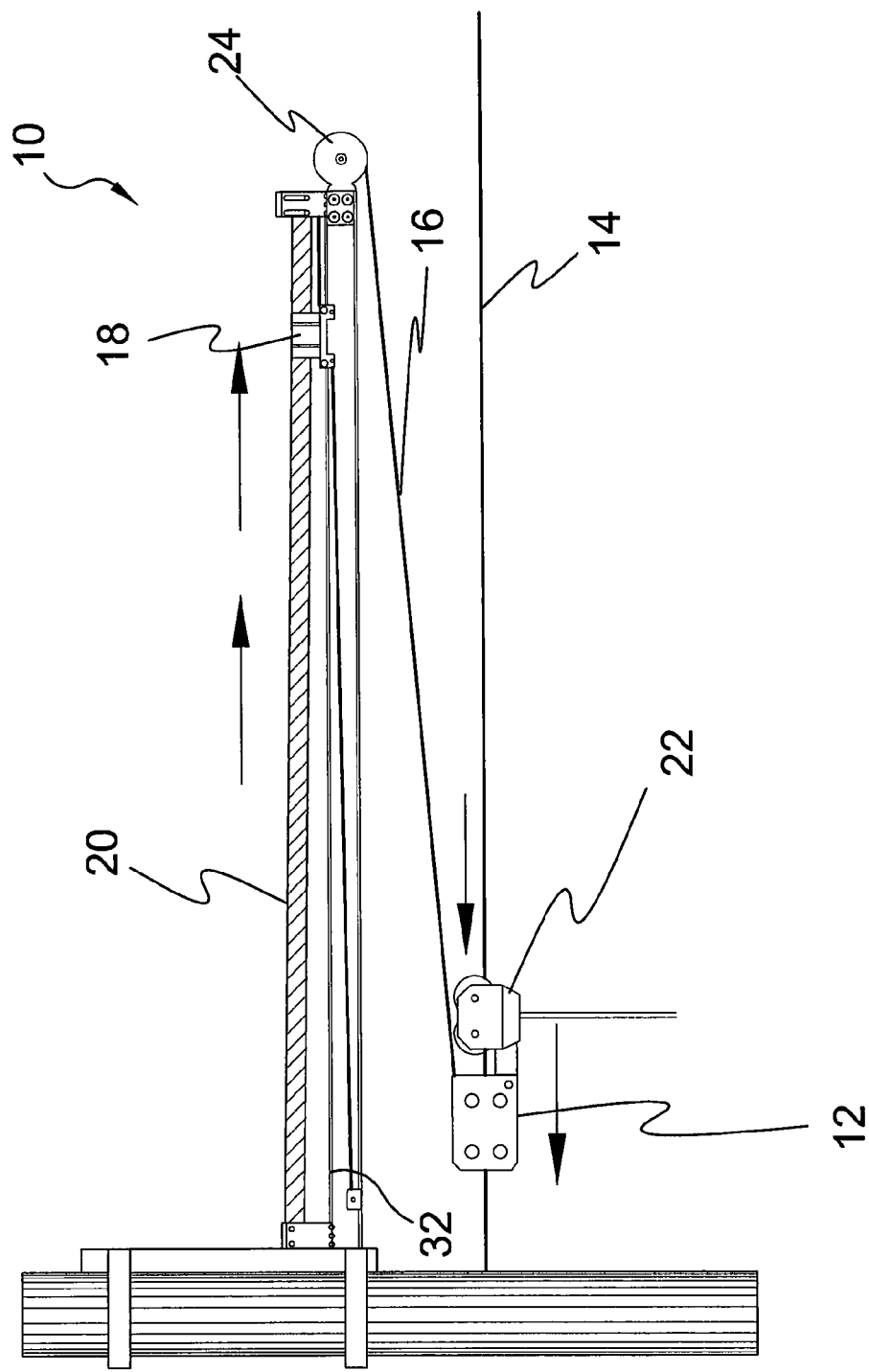
FIG. 4 is a side view of the present invention in use.

FIG. 4 is a side view of the present invention in use. Shown is the final brake position of the present invention present invention 10 when the trolley 22 makes contact with the brake block 12 and remotely engages the brake system via a brake cable 16 redirected by a pulley 24 to draw the magnet carrier 18 along a magnet carrier support track 32. The magnets of the magnet carrier 18 are disposed on opposing sides of the conductor 20 wherein the resulting eddy currents serve to create drag to slow down and stop travel of the magnet carrier 18 and the associated brake block 12 and trolley 22.

Figure 5:
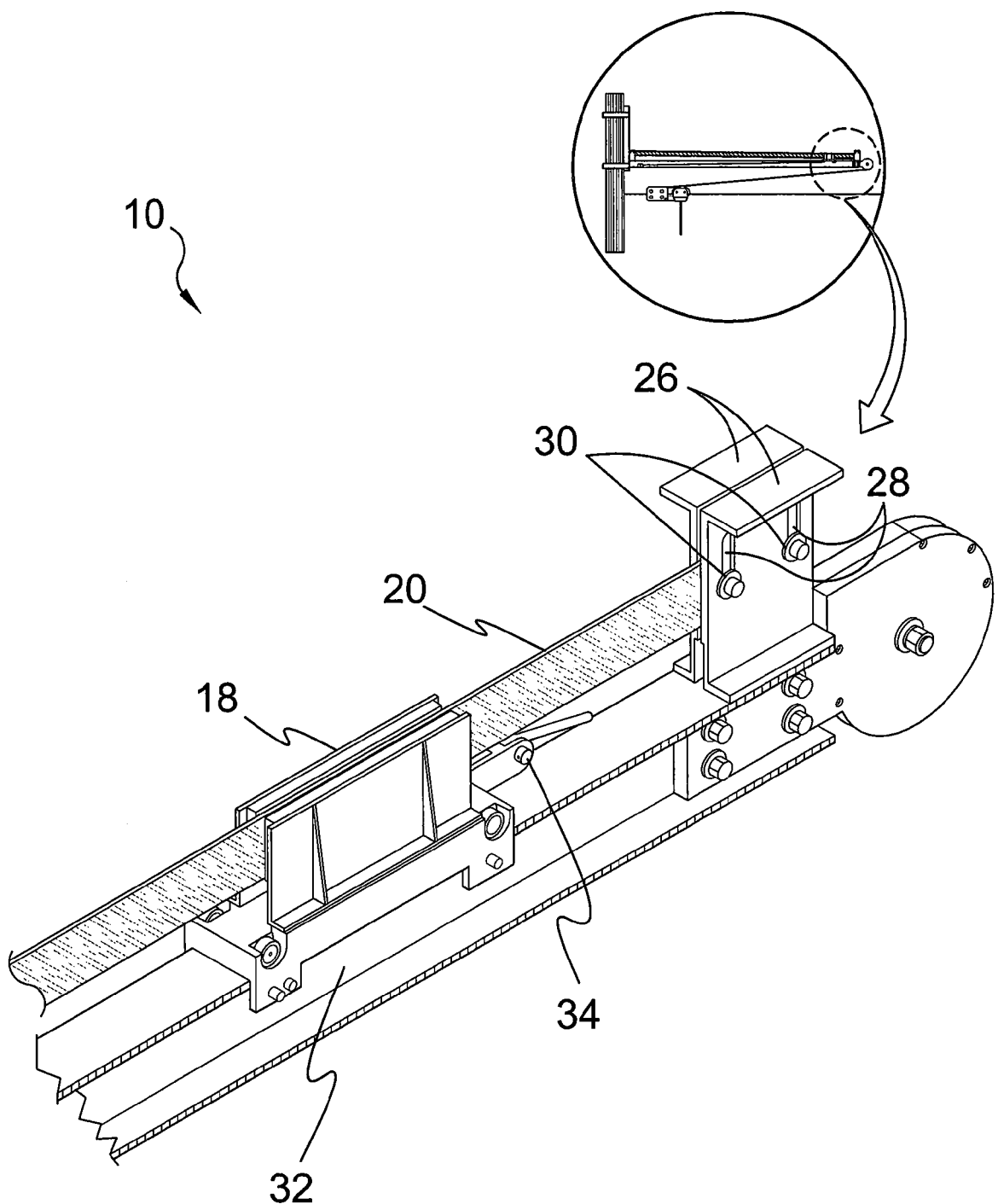
FIG. 5 is a perspective view of the magnet carrier of the present invention.

FIG. 5 is a perspective view of the magnet carrier 18 of the present invention 10. Shown is the magnet carrier 18 installed with the copper sheet conductor 20 running through the middle of the magnet carrier 18. The magnet carrier 18 travels along an I-beam style support track 32 when drawn by the brake cable that is connected to brake cable connection point 34 on the magnet carrier 18. Also shown is the support post 26 for the conductor 20 having slots 28 for the adjustment bolts 30 thereby enabling the conductor 20 to be raised or lowered accordingly. The greater the surface area of the conductor 20 exposed to the magnetic field within the magnet carrier 18, the greater the resultant eddy currents and drag.

Figure 6:
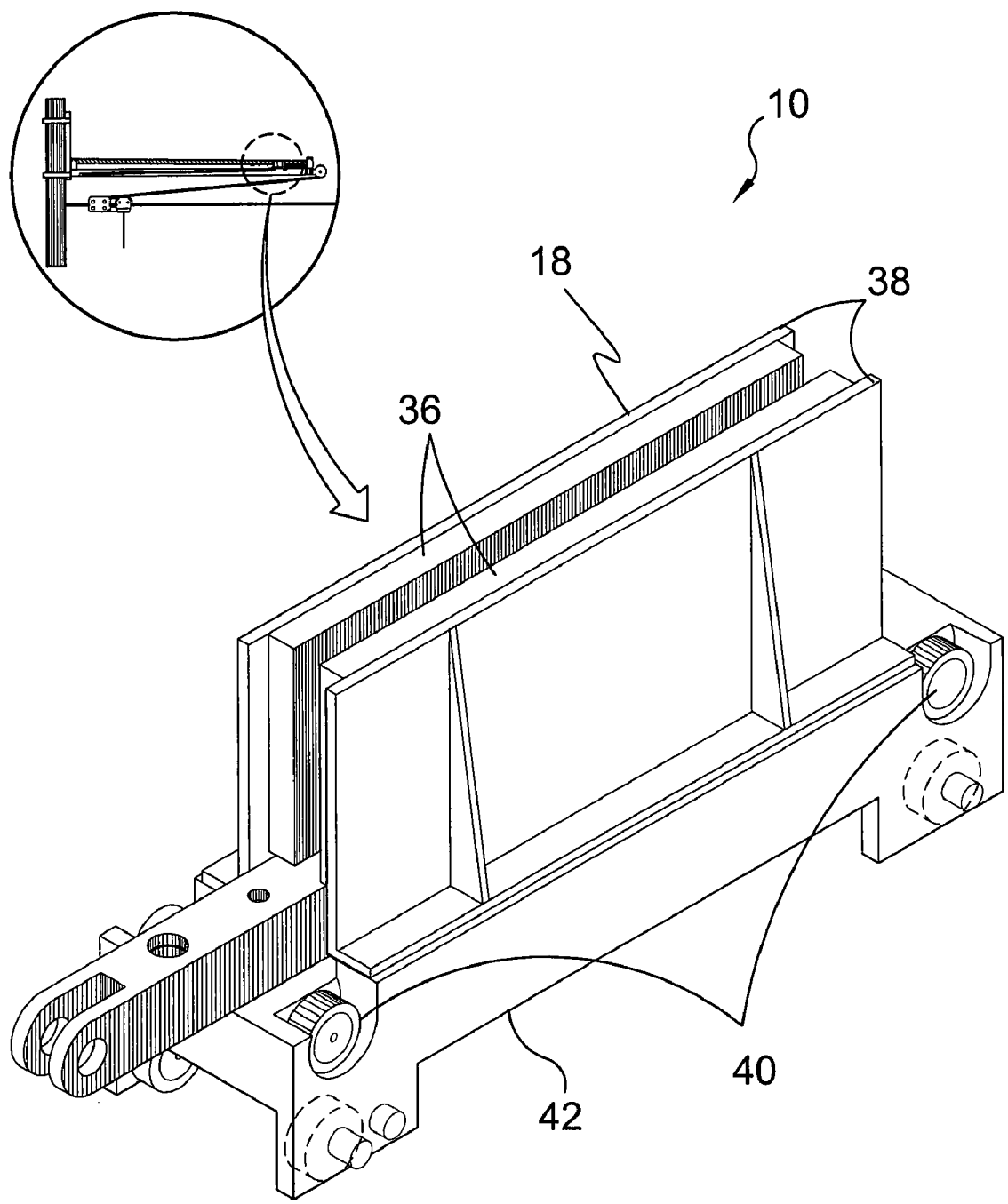
FIG. 6 is a detailed perspective view of the magnet carrier of the present invention.

FIG. 6 is a detailed perspective view of the magnet carrier 18 of the present invention 10. Shown is a detailed view of the magnet carrier 18 having a pair of interiorly disposed spaced apart magnets 36 mounted on steel back plates 38 projecting perpendicularly from a base 42. A plurality of wheels/covered cam followers 40 are disposed underneath the base 42 to reduce friction and wear as the magnet carrier 18 glides along the support track.

Figure 7:
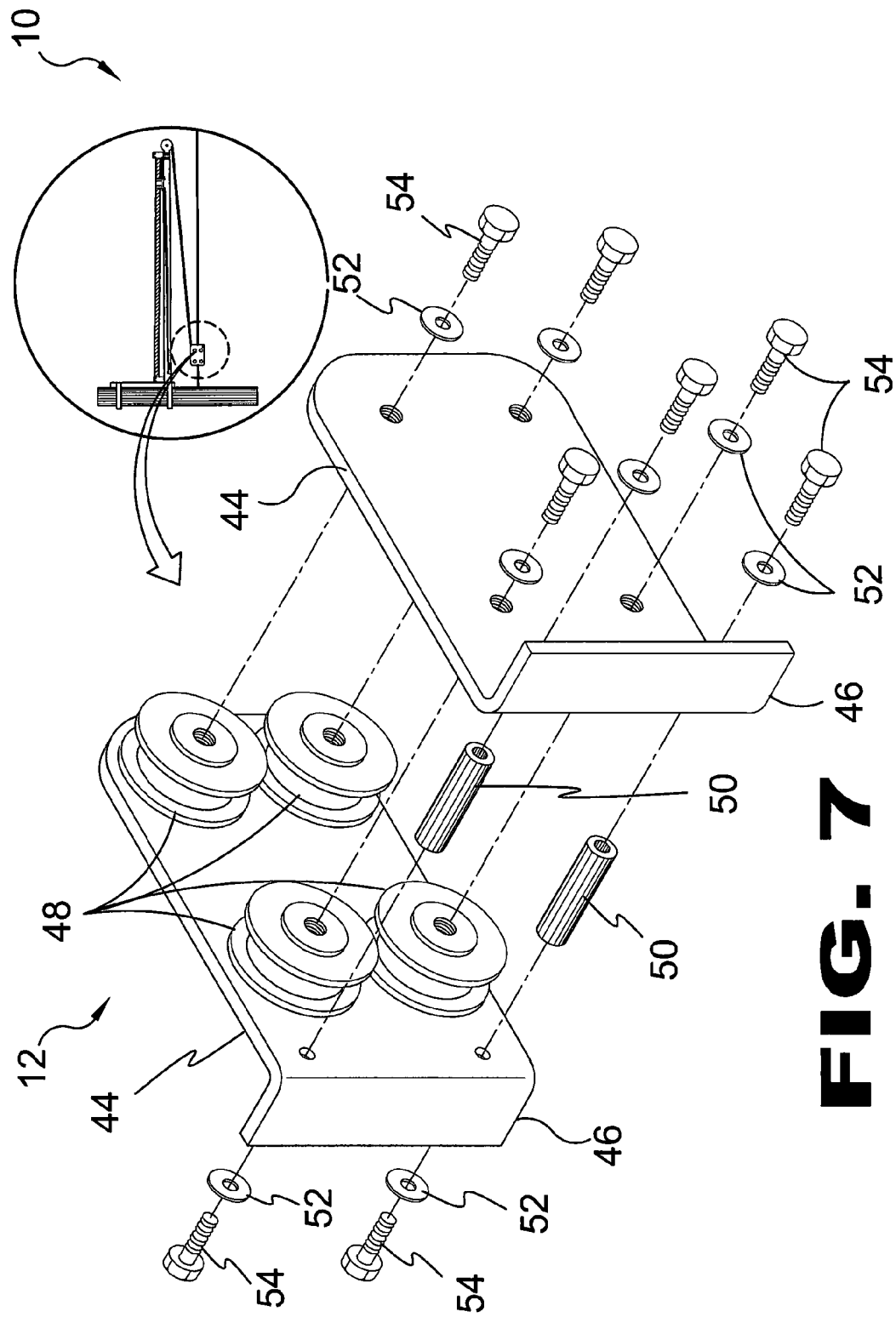
FIG. 7 is an exploded view of the brake block of the present invention.

FIG. 7 is an exploded view of the brake block 12 of the present invention 10. The brake block 12 is intended to ride on the primary zipline. Rider's trolley will encounter this block 12, which is attached to the brake cable that will engage the magnet carrier in some remote location. Thus as this moves, it will move the magnet carrier along the conductor via the brake cable. This design features sheaves/wheels that will allow smooth travel on the zipline, reducing wear and initial impact to the trolley and zipline rider. The brake block assembly 12 comprises a pair of spaced apart housing plates 44 with each having a contact flange 46 extending perpendicularly outward from on end to form a substantially flat surface for engaging the trolley. A plurality of pulley wheels 48 are freewheelingly disposed between the housing plates 44 and the unit is assembly using a plurality of threaded spacers 50, bolts 54 and washers 52.

Figure 8:
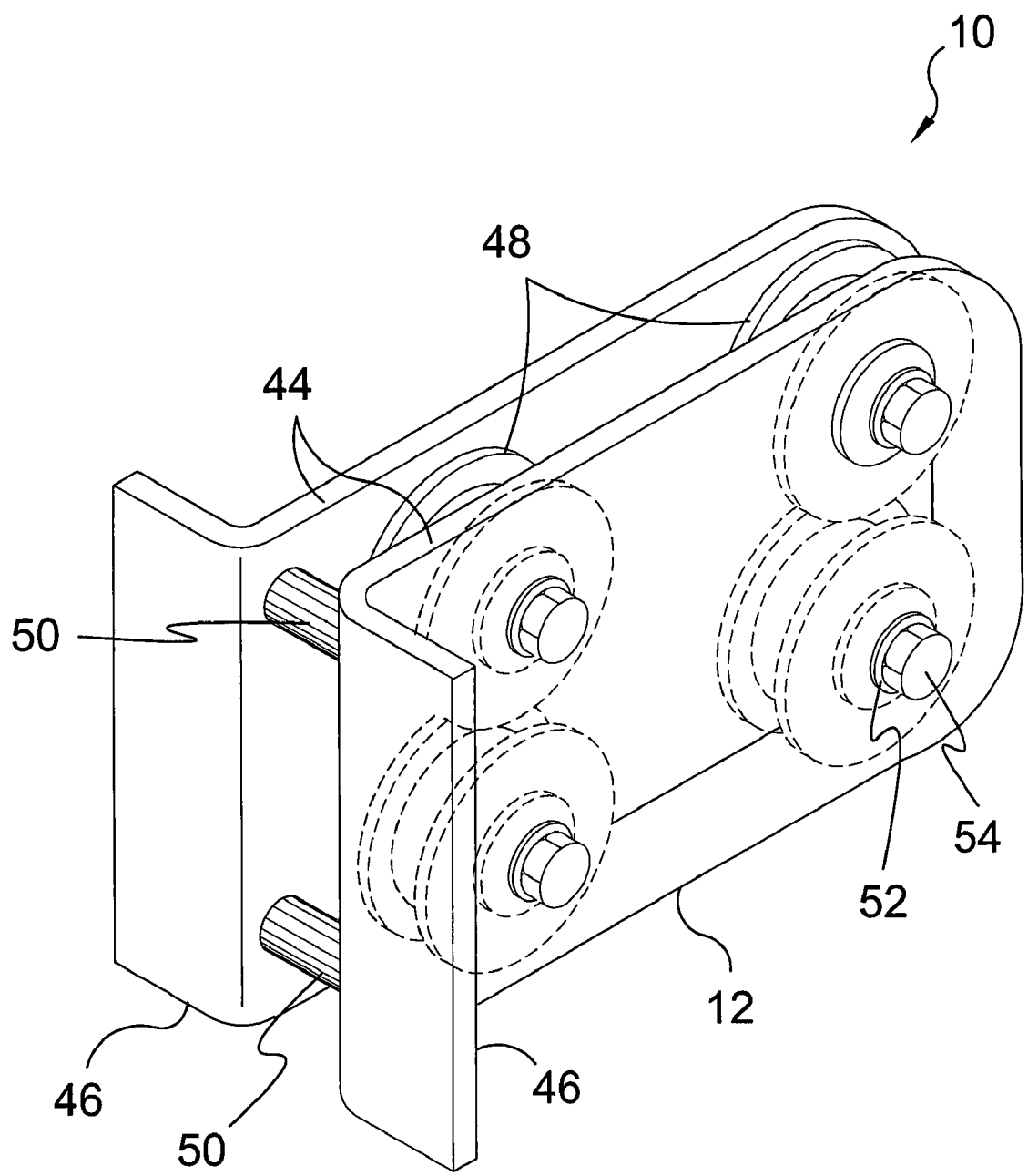
FIG. 8 is an assembled perspective view of the brake block of the present invention.

FIG. 8 is an assembled perspective view of the brake block of the present invention 10. The brake block assembly 12 comprises a pair of spaced apart housing plates 44 with each having a contact flange 46 extending perpendicularly outward from on end to form a substantially flat surface for engaging the trolley. A plurality of pulley wheels 48 are freewheelingly disposed between the housing plates 44 and the unit is assembly using a plurality of threaded spacers 50, bolts 54 and washers 52.

Figure 9:
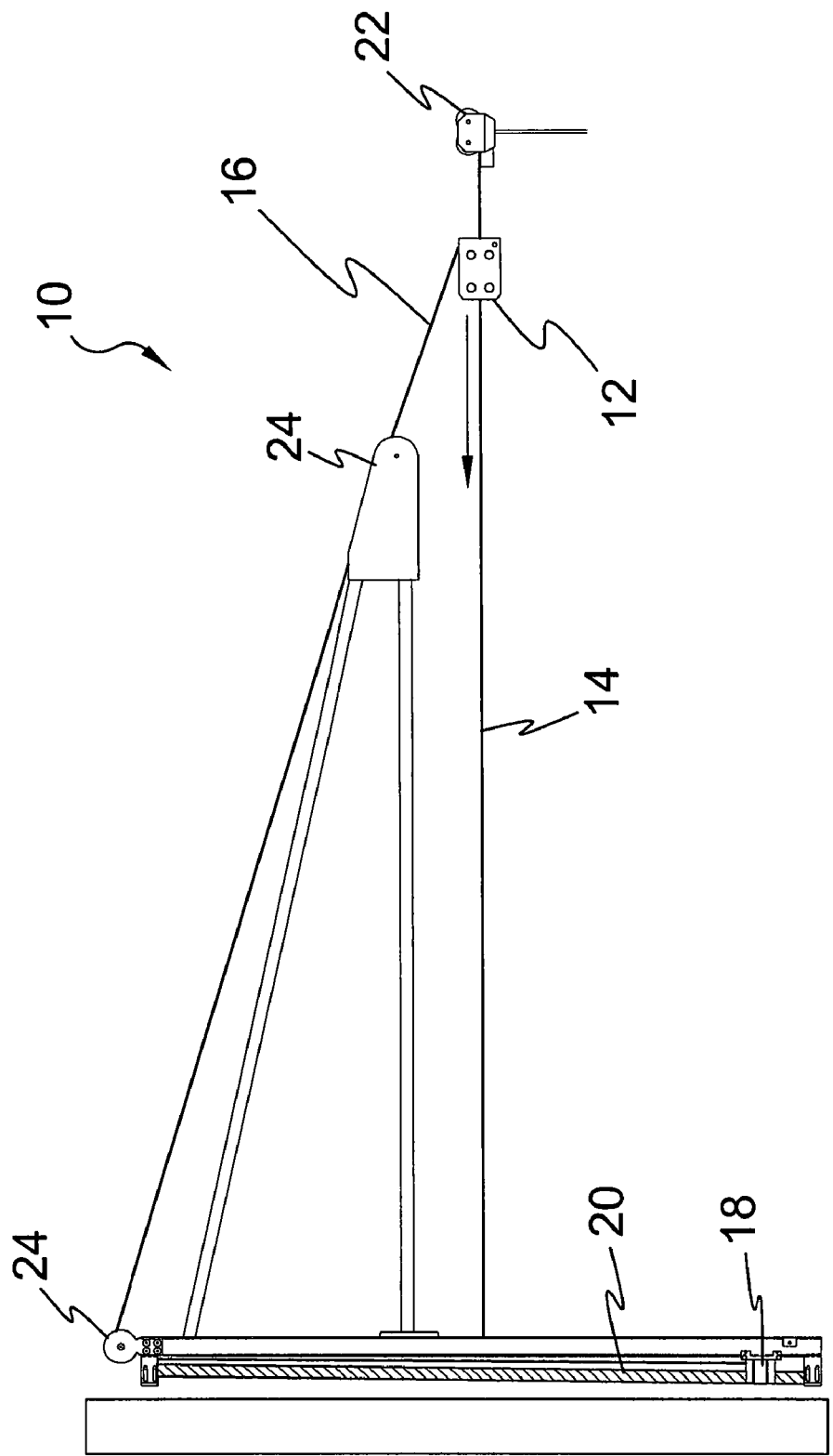
FIG. 9 is a side view of option two of the present invention in use.

FIG. 9 is a side view of option two of the present invention 10 in use. Shown is the position of the present invention 10 prior to the trolley 22 making contact with the brake block 12 on the zip line 14, remotely engages the brake system via a brake cable 16 or rope. The conductor 20 and magnet carrier 18 are oriented vertically and a plurality of pulleys 24 is employed. This serves to demonstrate that the rigging may set-up accordingly for the needs of the application without deviating from the function of the components.

Figure 10:
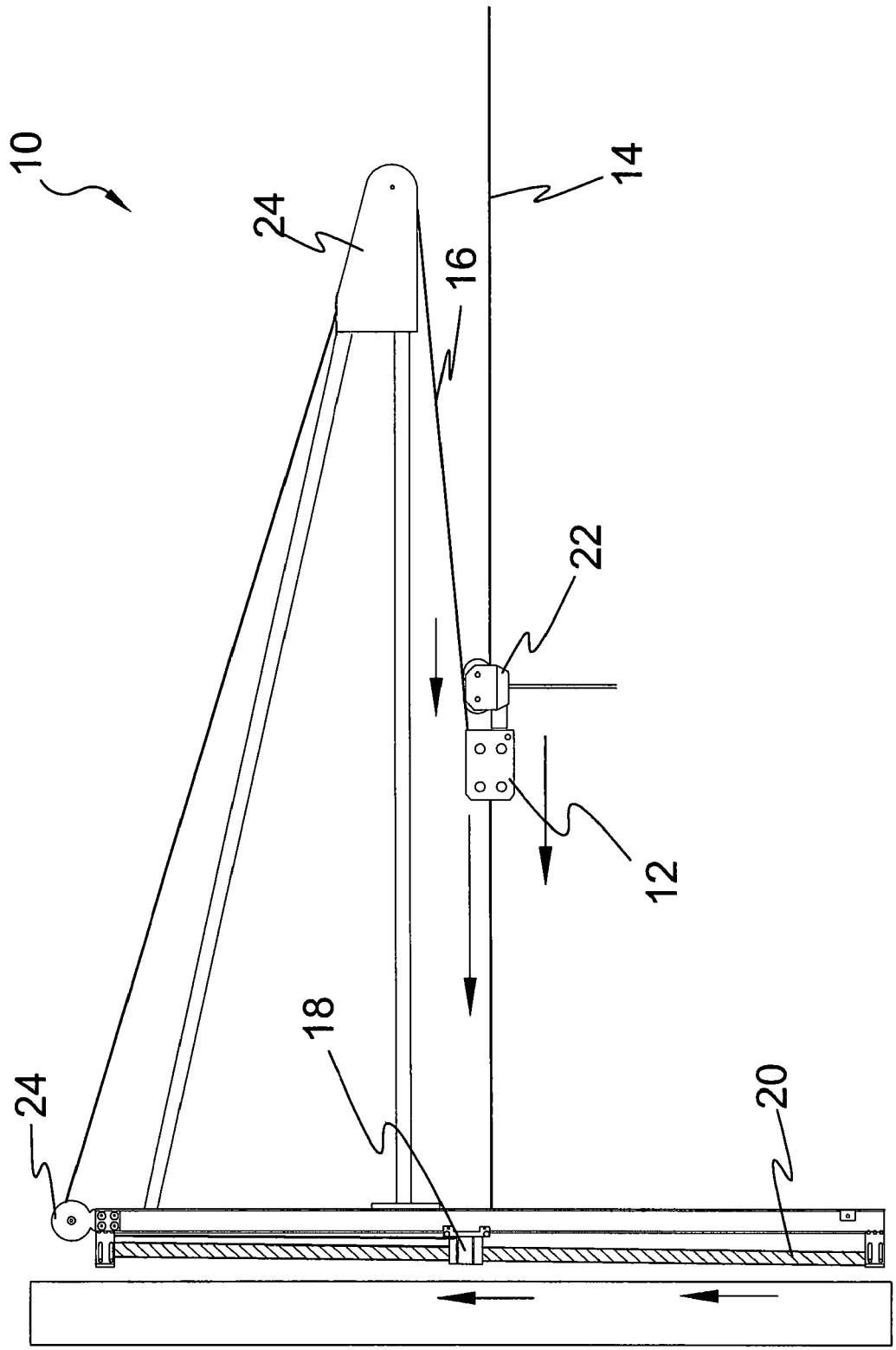
FIG. 10 is a side view of the second option of the present invention in use.

FIG. 10 is a side view of the second option of the present invention 10 in use. Shown is the half way position of the present invention 10 when the trolley 22 makes contact with the brake block 12 on the zip line 14 thereby drawing the brake cable 16 through the pulleys 24 and pulling the magnet carrier 18 upward along the conductor 20.

Figure 11:
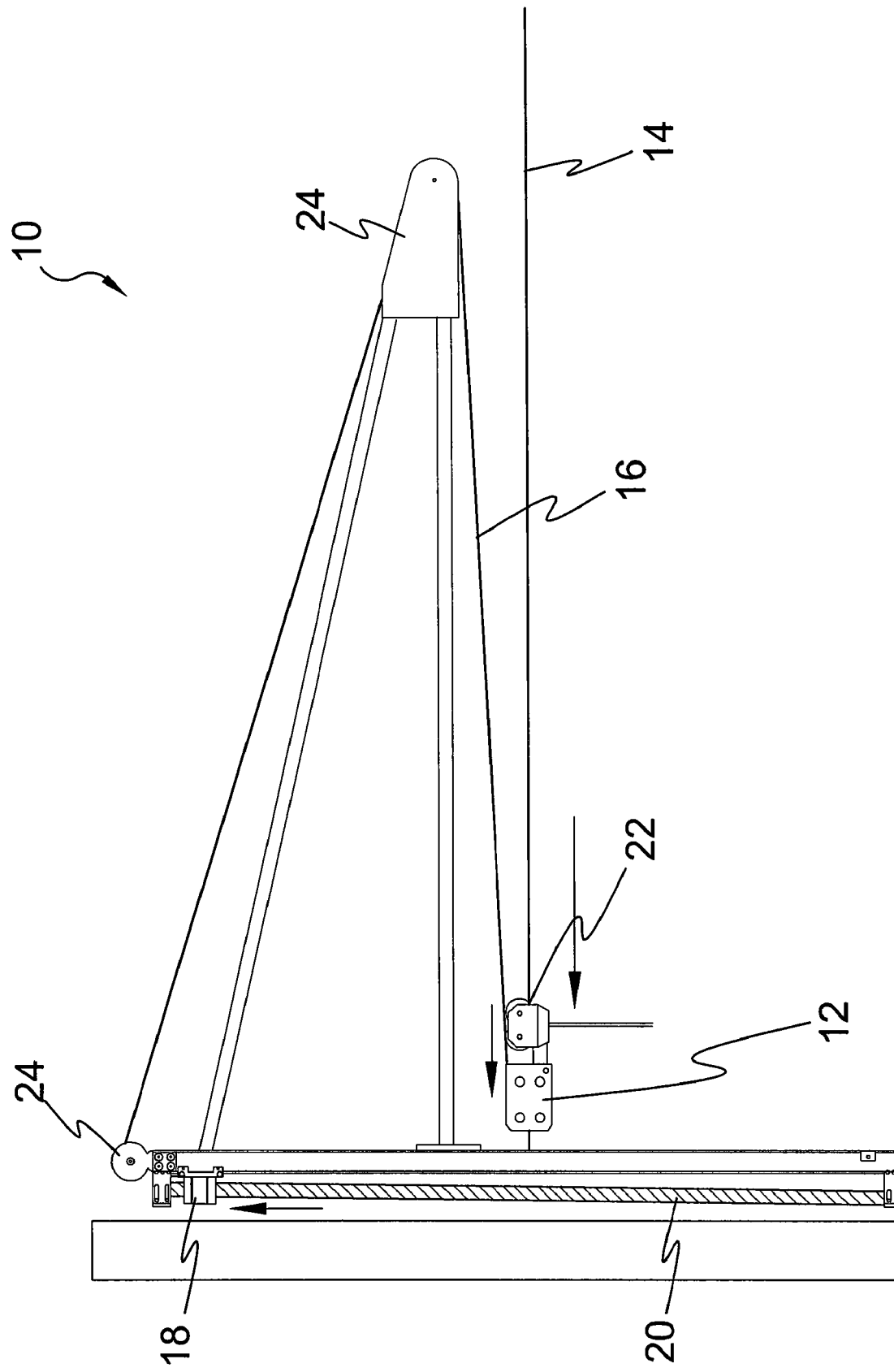
FIG. 11 is a side view of the present invention in use.

FIG. 11 is a side view of the present invention in use. Shown is the final brake position of the present invention 10 when the trolley 22 pushed the brake block 12 on the zip line 14 thereby drawing the brake cable 16 through the pulleys 24 and pulling the magnet carrier 18 upward along the conductor 20.

Figure 12:
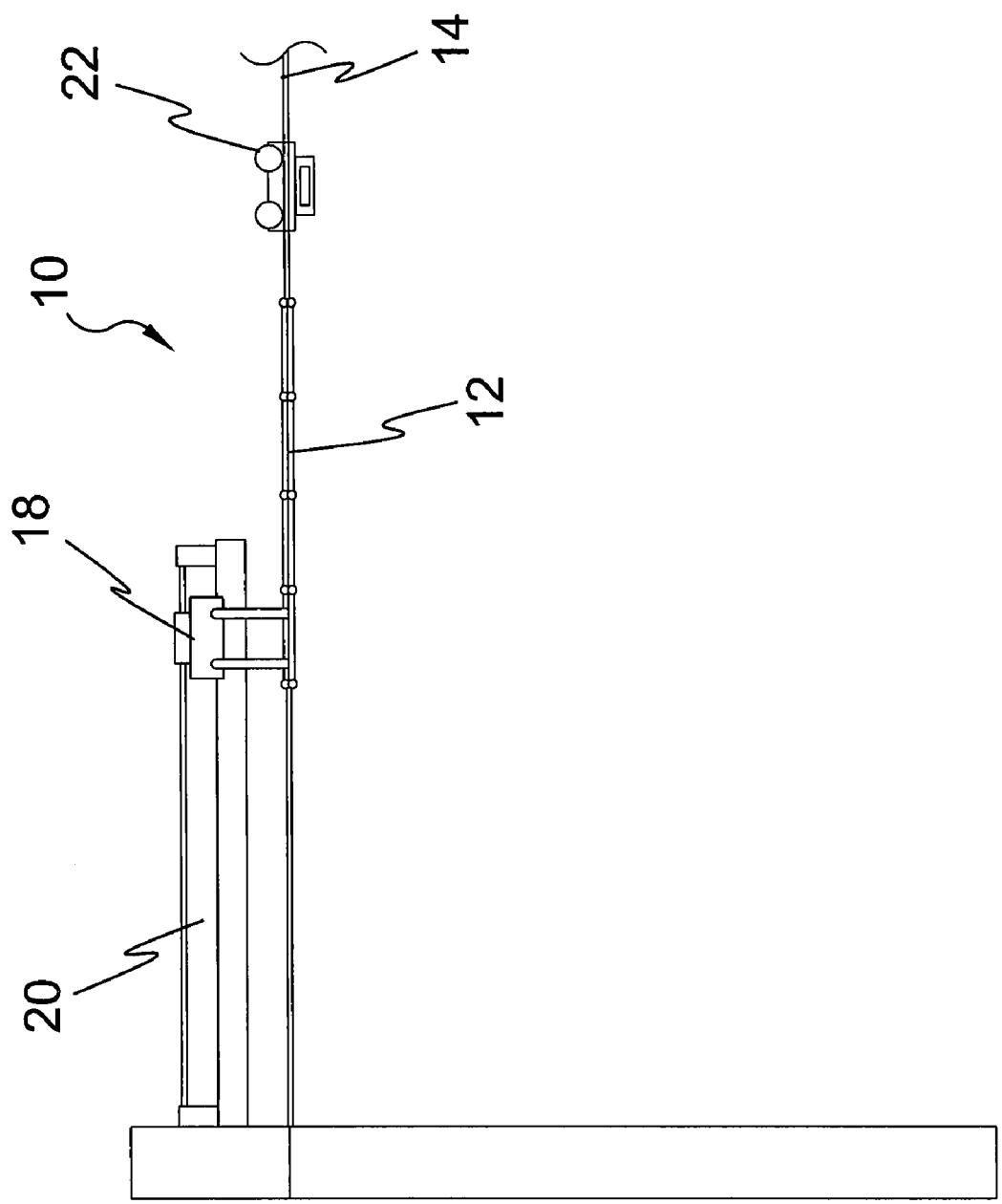
FIG. 12 is a side view of an alternate brake block.

FIG. 12 is a side view of an alternate brake block. Shown is an alternate configuration of the eddy current braking system 10 for zip line 14 trolleys 22 comprising a brake block 12 having the magnetic carrier 18 fixed thereto and forming an integral part therewith. The present invention provides that the magnetic carrier 18 can be moved along the conductive member 20 inducing eddy currents by pushing or pulling the magnetic carrier 18. As illustrated, the brake block 12 and magnet carrier 18 are combined into a single unit that can be pushed or pulled along the zip line 14.

Figure 13:
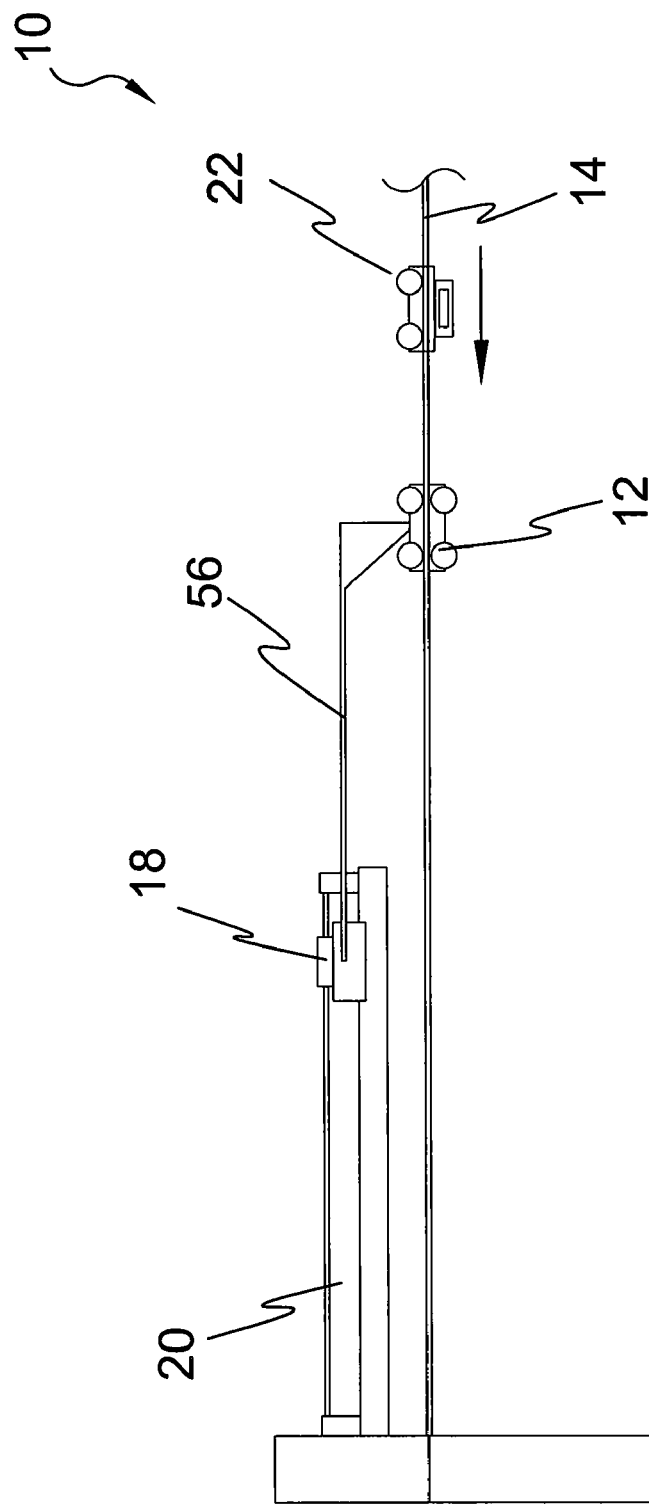
FIG. 13 is a side view of another alternate brake block.

FIG. 13 is a side view of another alternate brake block. Shown is an alternate configuration of the eddy current braking system 10 for zip line 14 trolleys 22 comprising a brake block 12 and magnetic carrier 18 having a rigid connective member 56 therebetween used to drive the magnetic carrier 18 along the conductive member 20 inducing eddy currents by pushing the magnetic carrier 18. The present invention provides that the magnet carrier can be pushed or pulled along the conductive member 20 when the trolley engages break block 12.

Figure 14:
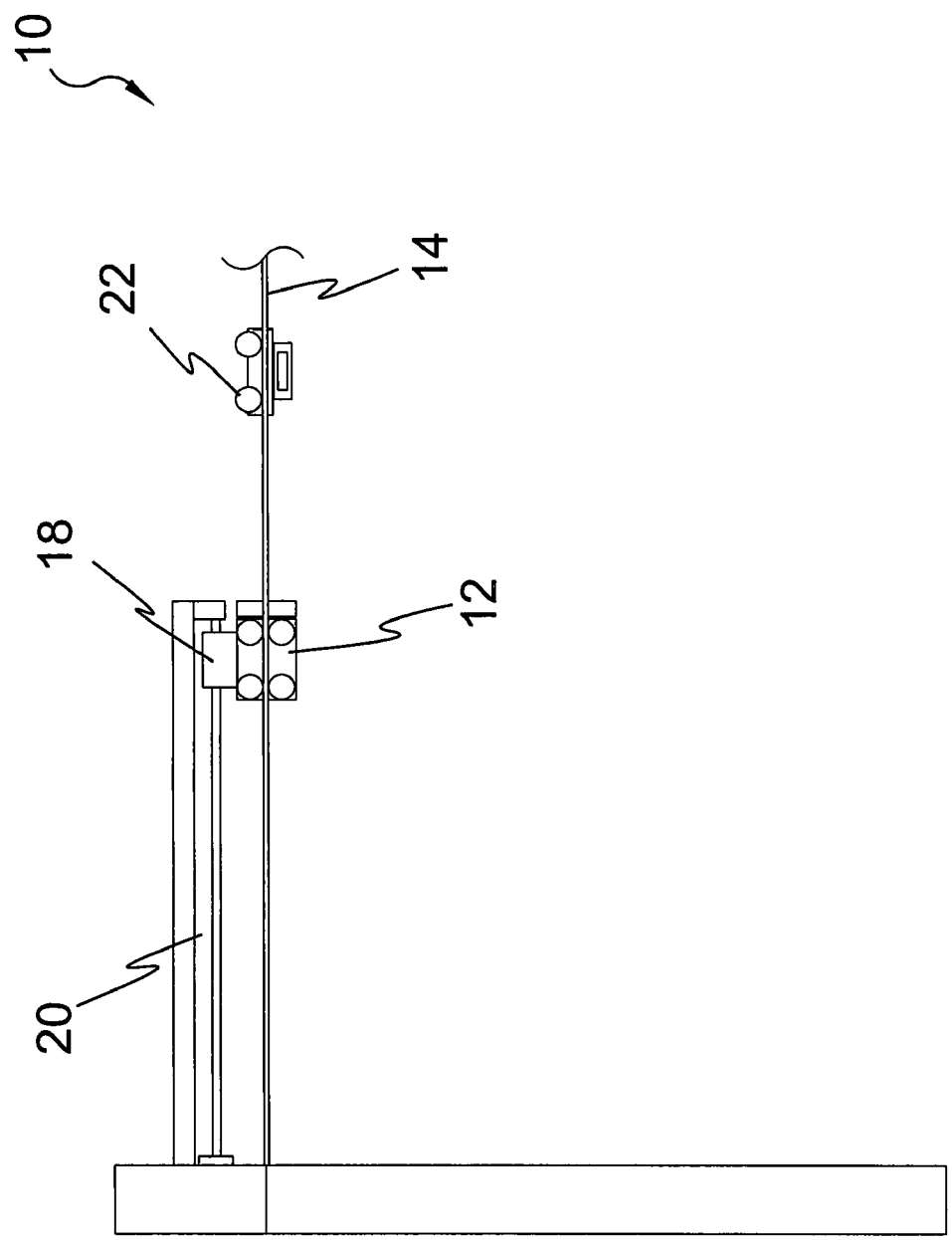
FIG. 14 is a side view of an alternate brake block magnet carrier configuration.

FIG. 14 is a side view of an alternate brake block magnet carrier configuration. Shown is an alternate configuration of the eddy current braking system 10 for zip line 14 trolleys 22 comprising an elongated brake block 12 having connective members engaging the magnetic carrier 18 fixed thereto and forming an integral part therewith. The present invention provides that the magnetic carrier 18 can be moved along the conductive member 20 inducing eddy currents by pushing or pulling the magnetic carrier 18 when the trolley engages break block 12. As illustrated, the brake block 12 and magnet carrier 18 are combined into a single unit that can be pushed or pulled along the zip line 14.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A braking system in combination with a trolley and a zip line, the braking system utilizing eddy currents to slow down and stop the trolley advancing on the zip line, the combination comprising:
    a) a brake block assembly disposed proximal the stopping area of the zip line;
    b) a stationary elongate conductor plate;
    c) a magnet carrier assembly having opposing magnetic fields disposed therein; and
    d) a magnet carrier support track for guiding the travel of said magnet carrier along said conductor plate;
    e) wherein said magnet carrier support track further comprises a pair of support posts located thereon for retaining said conductor between said ma net during the movement thereof; and
    f) wherein said support posts further include means for adjusting the pitch of said conductor to increase and decrease the surface area interfaces with the magnetic fields in said magnet carrier thereby enabling a user to manipulate the eddy current effect and the resultant drag.

2. The combination recited in claim 1, wherein the trolley engages said brake block assembly as the trolley travels along the zip line.

3. The combination recited in claim 2, wherein the movement of said brake block assembly engages said magnet carrier affixed to said brake block assembly along said conductor.

4. The combination recited in claim 3, wherein the movement of said magnet carrier on each side of said conductor create eddy currents which produce drag to impede movement thereof.

5. The combination recited in claim 4, wherein the drag presented to said magnet carrier is transferred directly to the affixed brake block assembly and the trolley urging it forward thereby slowing the trolley and the brake block assembly down and eventually preventing further advancement.

6. The combination recited in claim 1, further comprising at least one pulley that is used to redirect a brake cable to enable said conductor and magnet carrier to be disposed in a remote location.

7. The combination recited in claim 1, wherein said brake block assembly comprises:
   a) a pair of spaced-apart opposing housing plates;
   b) a contact flange projecting perpendicularly from one end of each said housing plate for engaging said trolley;
   c) a plurality of freewheeling pulley wheels to provide smooth, stable travel along said zip line and reduce friction and wear thereto; and
   d) means for securing the entire assembly into a single unit.

8. The combination recited in claim 7, wherein said securing means is a plurality of spacers, bolts and washers.

9. The combination recited in claim 7, wherein the plurality of pulley wheels are aligned coplanarly and spaced apart to accommodate said zip line and in engagement therewith.

10. The combiantion recited in claim 1, wherein said magnet carrier comprises:
    a) a base;
    b) a pair of spaced apart steel back mounting plates projecting perpendicularly from said base;
    c) a magnetic plate mounted interiorly on each said mounting plate;
    d) a gap between said magnets with a gap therebetween to accommodate said conductor therein without making contact therewith; and
    e) a plurality of wheeled cam followers disposed on the underside of said base to reduce friction and wear as the magnet carrier travels along said support track.

11. The combination recited in claim 1, wherein said adjustment means is a pair of slots in said support post through which adjustment bolts secure said conductor in place with the pitch being determined by the position of the secured bolts.

12. The combination recited in claim 1, further comprising a brake cable communicating between said brake block assembly and said magnet carrier.

13. The combination recited in claim 1, wherein said brake block assembly and magnet carrier are combined to form an integral unit.

14. The combination recited in claim 1, wherein said brake block assembly and magnet carrier have a rigid spacer therebetween whereby the magnet carrier can be driven along the conductive member.

\* \* \* \* \*